H. LOCKHART.
HEATER.
APPLICATION FILED NOV. 5, 1920.

1,387,856.  Patented Aug. 16, 1921.

WITNESSES

Leroy A. Kauffman.

Howard Lockhart. Inventor

By Richard B. Owen.

Attorney

UNITED STATES PATENT OFFICE.

HOWARD LOCKHART, OF FALLS CITY, NEBRASKA, ASSIGNOR TO E. R. HAYS AND R. A. HEACOCK, BOTH OF FALLS CITY, NEBRASKA.

HEATER.

1,387,856.      Specification of Letters Patent.     Patented Aug. 16, 1921.

Application filed November 5, 1920. Serial No. 421,979.

*To all whom it may concern:*

Be it known that I, HOWARD LOCKHART, a citizen of the United States, residing at Falls City, in the county of Richardson and State of Nebraska, have invented certain new and useful Improvements in Heaters, of which the following is a specification.

This invention relates to new and useful improvements in tank heaters, and more particularly to that type which are adapted to be submerged in stock watering troughs and the like, the primary object of the invention being to provide a heater casing having a portion thereof disposed in close proximity to the grate whereby this portion of the casing will become intensely heated and will consequently radiate a great amount of heat to the water surrounding this portion of the casing.

Another object of the invention is to provide a device of the above nature including an inclined grate whereby hot ashes are directed onto the portion of the casing disposed in proximity thereto, and the invention also has for an object to so arrange and incline the portion of the casing which is arranged in proximity to the grate in such a manner that ashes discharging from the grate will be directed toward the clean-out-chute to facilitate cleaning out of the ash pit.

Other objects and advantages of the invention will become apparent during the course of the following description.

In the accompanying drawings forming a part of the application, and wherein like numerals are employed to designate like parts throughout the several views—

Figure 1:
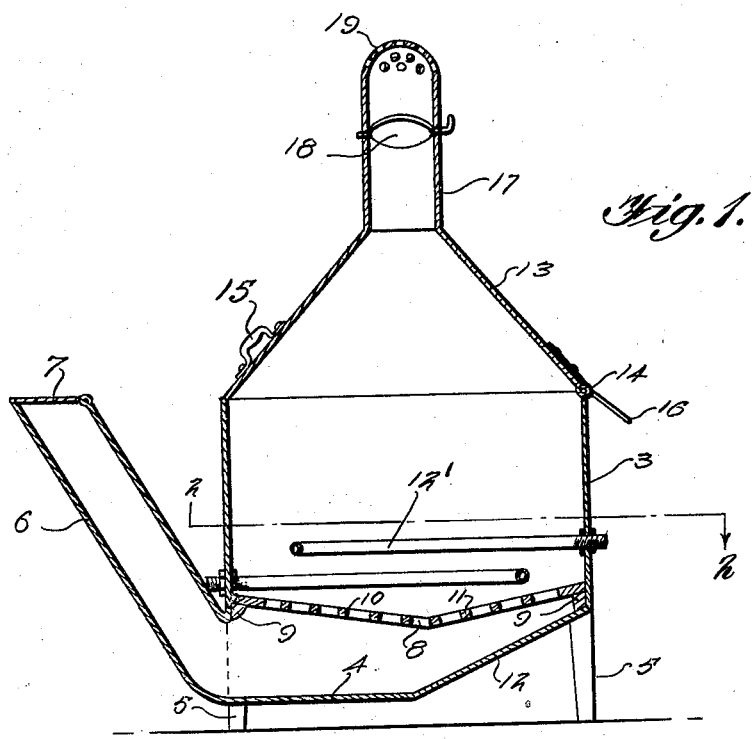
Figure 2:
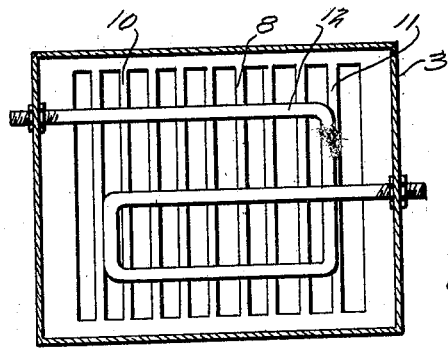

Figure 1 is a vertical section taken substantially through the heater structure, and Fig. 2 is a transverse section on the line 2—2 of Fig. 1.

Referring to the drawings wherein for the purpose of illustration is shown the preferred embodiment of the invention I have illustrated my invention in connection with a heater similar to that shown in Patent #1,287,983 which it is my intention to improve with the invention to be hereinafter described. A liquid tight casing is designated by the numeral 3 and is adapted, as will be understood, to be submerged in a tank of liquid for heating the latter. The bottom 4 of the heater is supported in spaced relation above the bottom of the tank into which the device is disposed, by supporting legs 5, any number of which may be provided according to the configuration of the casing 2. A draft and clean-out-chute 6 is connected at one side of the casing 3 near the bottom thereof and extends upwardly and outwardly substantially as shown in Fig. 1. The top of this chute is extended upwardly to be substantially on the same level with the open top of the casing 3, and is provided with a door 7 mounted to the upper edge of the chute. It will of course be obvious that this door may be used for controlling the draft of the heater.

The grate 8 is supported by supporting bars 9 secured to the interior of the heater, one of the bars 9 being disposed at the juncture of the upper wall of the clean-out-chute and the adjacent vertical wall of the casing 3 for a purpose which will hereinafter appear. As clearly shown in Fig. 1, the grate is V-shaped in cross section so that one portion 10 of the grate inclines downwardly toward the bottom of the casing from the clean-out-chute 6. The other portion 11 of the grate inclines downwardly toward the bottom to meet the portion 10 and from the opposite side of the casing 3. Due to the inclination of the portion 10, it will be obvious that a clinker rod, not shown, having an angularly disposed hooked end may be inserted down through the clean-out-chute 6 and engaged with the fire between the grate bars.

Approximately one half of the bottom 4 remote from the clean-out-chute and disposed oppositely thereof is inclined as at 12 to be disposed in close proximity to the grate portion 11 and to incline downwardly from one side of the casing 3 toward the clean-out-chute so that ashes and cinders deposited upon this inclined portion 12 from the grate will slide toward the inner end of the clean-out-chute to facilitate cleaning of the ash pit with a suitable shovel inserted into the clean-out-chute. Furthermore, it will be obvious that a fire upon the grate will heat the portion 12 of the bottom to a high degree as well as will the hot ashes falling from the grate, thereby increasing the heating capacity of the device. It will be noted that the grate portion 10 is longer than its coacting portion whereby the natural tendency of a fire built upon the grate will be to move over toward the first portion 11 thereby providing for the red hot ashes dropping upon the portion 12 of the bottom.

To further increase the heating capacity of the device, a water coil 12' is mounted within the casing 3 directly over the grate 8, one end of the coil entering one side of the casing and extending toward the opposite side. The coil is then directed toward the center of the casing and toward the side of the casing 3, is then directed toward the end of the casing from which it enters, then toward the center of the casing, and then longitudinally of the casing to extend through the end of the casing opposite to the end through which it enters. Opposite ends of the coil are open so that water within the tank in which the heater is submerged will automatically pass through the coil 12' as it becomes heated.

The open top of the casing 3 is provided with a cover 13 hinged as at 14 to one side of the casing whereby the cover may be grasped by the handle 15 to swing the same to an open position whereby fuel may be inserted into the casing. A stop 16 is carried by the hinged side of the cover to limit the opening movement thereof and to retain the cover in an open position when it has been swung to its extent. It will be noted that the cover is brought up in a gradual taper to merge with a smoke pipe or flue 17 having a damper 18 therein and a spark arrester 19 at the top of the flue. From the foregoing description, it is thought that the use and operation of the device is readily obvious.

The foregoing description and the accompanying drawing has reference to the preferred or approved form of my invention. It is to be understood however that such changes may be made in construction and arrangement of parts, materials, dimensions, etc., as may prove expedient and fall within the scope of the appended claims.

Having thus fully described my invention what I claim as new and desire to secure by Letters Patent is:—

1. A tank water heater comprising a casing adapted to be submerged in a water tank and having its bottom spaced from the bottom of said water tank, said casing provided with a clean-out-chute communicating with the bottom thereof, a grate in said casing, and the bottom of the casing opposite the clean-out-chute being inclined downwardly and toward the end of the clean-out-chute for directing ashes toward the end thereof.

2. In a water heater, the combination with a casing, and a V-shaped grate therein, of a portion of the bottom of the casing being inclined and arranged in proximity to the grate.

In testimony whereof I affix my signature in presence of two witnesses.

HOWARD LOCKHART.

Witnesses:
H. BRECHT,
CONRAD BRECHT.